United States Patent [19]
Guido et al.

[11] Patent Number: 5,628,292
[45] Date of Patent: May 13, 1997

[54] METHOD AND SYSTEM FOR GENERATING AN ENGINE POSITION DEPENDENT OUTPUT CONTROL SIGNAL

[75] Inventors: Samuel J. Guido, Dearborn; Rollie M. Fisher, Trenton; Mark S. Ramseyer, Livonia, all of Mich.; Rudolf Bettelheim, Buda, Tex.; Micah C. Knapp, New Haven, Conn.

[73] Assignees: Ford Motor Company, Dearborn, Mich.; Motorola, Inc., Schaumburg, Ill.

[21] Appl. No.: 625,378

[22] Filed: Apr. 1, 1996

[51] Int. Cl.$^6$ ................. F02P 7/07; F02P 5/15
[52] U.S. Cl. .............. 123/414; 123/417; 364/431.04
[58] Field of Search .................. 123/414, 416, 123/417, 617, 643; 73/116, 117.3, 118.1; 324/207.22, 207.25; 364/431.04, 431.05, 431.07, 559

[56] References Cited

U.S. PATENT DOCUMENTS

| | | | |
|---|---|---|---|
| 4,355,613 | 10/1982 | Rode et al. | 123/414 |
| 4,469,081 | 9/1984 | Mate | 123/417 X |
| 5,103,668 | 4/1992 | Drutel et al. | 324/207.22 X |

*Primary Examiner*—Tony M. Argenbright
*Attorney, Agent, or Firm*—Peter Abolins; Roger L. May

[57] ABSTRACT

A method and system for generating a position dependent output control signal. The position of a rotating machine, such as an internal combustion engine, is sensed and a corresponding position signal is generated. The position signal is processed to obtain the position dependent output control signal including a first control signal and a second control signal. The first control signal represents a sector of the rotating machine, and the second control signal represents the absolute position within the sector.

15 Claims, 4 Drawing Sheets

METHOD AND SYSTEM FOR GENERATING AN ENGINE POSITION DEPENDENT OUTPUT CONTROL SIGNAL

TECHNICAL FIELD

This invention relates to methods and systems for generating an engine position dependent output control signal in a motor vehicle.

BACKGROUND ART

In an internal combustion engine control system many events are related to mechanical engine crankshaft position and some of these events are repeated at regular intervals during an engine cycle. For example, an ignition pulse has a repetition rate that depends on the number of cylinders in the engine, e.g., a four cylinder four stroke engine requires an ignition pulse to be generated every 180 engine degrees. If an engine position timebase with direct 0 degree to 720 degree is used, a 180 degree offset must be added to generate the next ignition event after each ignition event. Other engine events may occur at a repetition rate that is a different fraction of the complete engine cycle to the ignition events.

The known prior art includes generating a separate cylinder/ignition coil identifier control signal and an angular engine position identifier control signal interpolated from a clock timebase. The known prior art fails to provide a timebase encoding system that provides both multiple repetition cycles within an engine cycle and a reference to absolute engine cycle position.

DISCLOSURE OF THE INVENTION

A general object of the present invention is to provide a method and system for efficiently generating an engine position dependent output control signal having a reference to absolute engine cycle position.

In carrying out the above object and other objects, features and advantages, of the present invention, a method is provided for generating a position dependent output control signal for a rotating machine having a plurality of sectors. The method includes the step of sensing a position of the rotating machine and generating a corresponding position signal. The method further includes the step of processing the position signal to obtain the position dependent output control signal including a first control signal and a second control signal, the first control signal representing a sector of the rotating machine, and the second control signal representing the absolute position within that sector.

In further carrying out the above object and other objects, features and advantages, of the present invention, a system is also provided for carrying out the steps of the above described method. The system includes a sensor for sensing a position of the rotating machine and generating a corresponding position signal. The system further includes a processor for processing the position signal to obtain the position dependent output control signal including a first control signal and a second control signal, having the first control signal representing a sector of the rotating machine, and the second control signal representing the absolute position within that sector.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
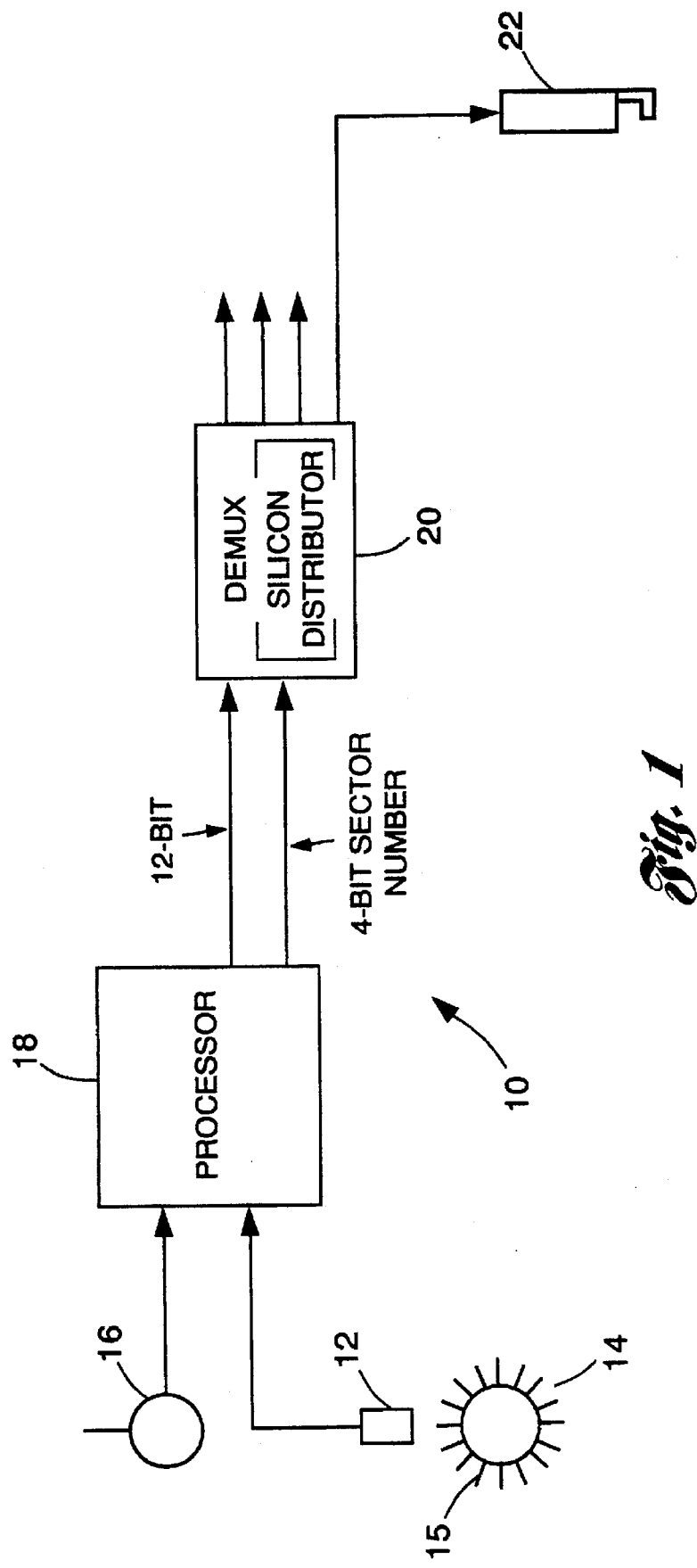
FIG. 1 is a schematic block diagram of the system of the present invention used in conjunction with an internal combustion engine of a motor vehicle.

The present invention includes a method and systems for determining a position dependent output control signal for a rotating machine having a plurality of sectors within the rotating machine. For illustrative purposes, the method and system of the present invention will be described in conjunction with an internal combustion engine of a motor vehicle. Turning now to FIG. 1, there is shown the system of the present invention, denoted generally by reference numeral 10. The system 10 includes a sensor 12 for sensing the position of the engine (not shown) of the motor vehicle (not shown) via a crankshaft 14. The sensor 12, such as a variable reluctance sensor (VRS), generates a corresponding engine position signal. The system 10 further includes a second sensor 16 for determining the cylinder identification (CID) and generating a corresponding CID signal. The CID sensor 16 may be a Hall-effect cylinder identification sensor.

The system 10 includes a processor 18 for processing the engine position signal and the CID signal to generate an engine position dependent output control signal. The processor 18 performs linear interpolation between the teeth 15 of the crankshaft 14, which effectively multiplies the resolution of the teeth 15. These higher resolution increments are called degree ticks and represent the resolution of the angle domain clocks and timebases. A resolution multiply factor contains the programmable number of degree ticks per tooth event.

Degree ticks are always based on previous tooth periods, which are measured by a tooth period counter. When a tooth event occurs, the period from the just past tooth is used to generate degree ticks for the just beginning tooth. Since acceleration and deceleration can cause a tooth period to be longer or shorter than the previous tooth period, the processor 18 ensures that exactly the correct number of degree ticks are produced for each tooth. This is done by incrementing degree ticks quickly or by stopping them until the next tooth event.

The engine position dependent output control signal generated by the processor 18 is preferably a sixteen-bit value including a sector signal and an angular engine position signal. The upper four bits of the sixteen-bit value is the sector signal containing the cylinder identification and the lower twelve bits contain the position of the engine. Events can then be referenced to either a combined sixteen-bit value that represents the full engine cycle (0 degrees to 720 degrees), or to the twelve-bit value that represents only the position within the cylinder.

For example, a spark event can be controlled using both the four-bit sector signal and the twelve-bit angular engine position signal. In this case, the four-bit sector signal is transferred to a silicon distributor 20, as shown in FIG. 1. The silicon distributor 20 then sends a signal to a corresponding spark plug 22 for ignition. The twelve-bit angular engine position signal is used to determine when a spark ignition pulse is to be generated and for how long.

Figure 2:
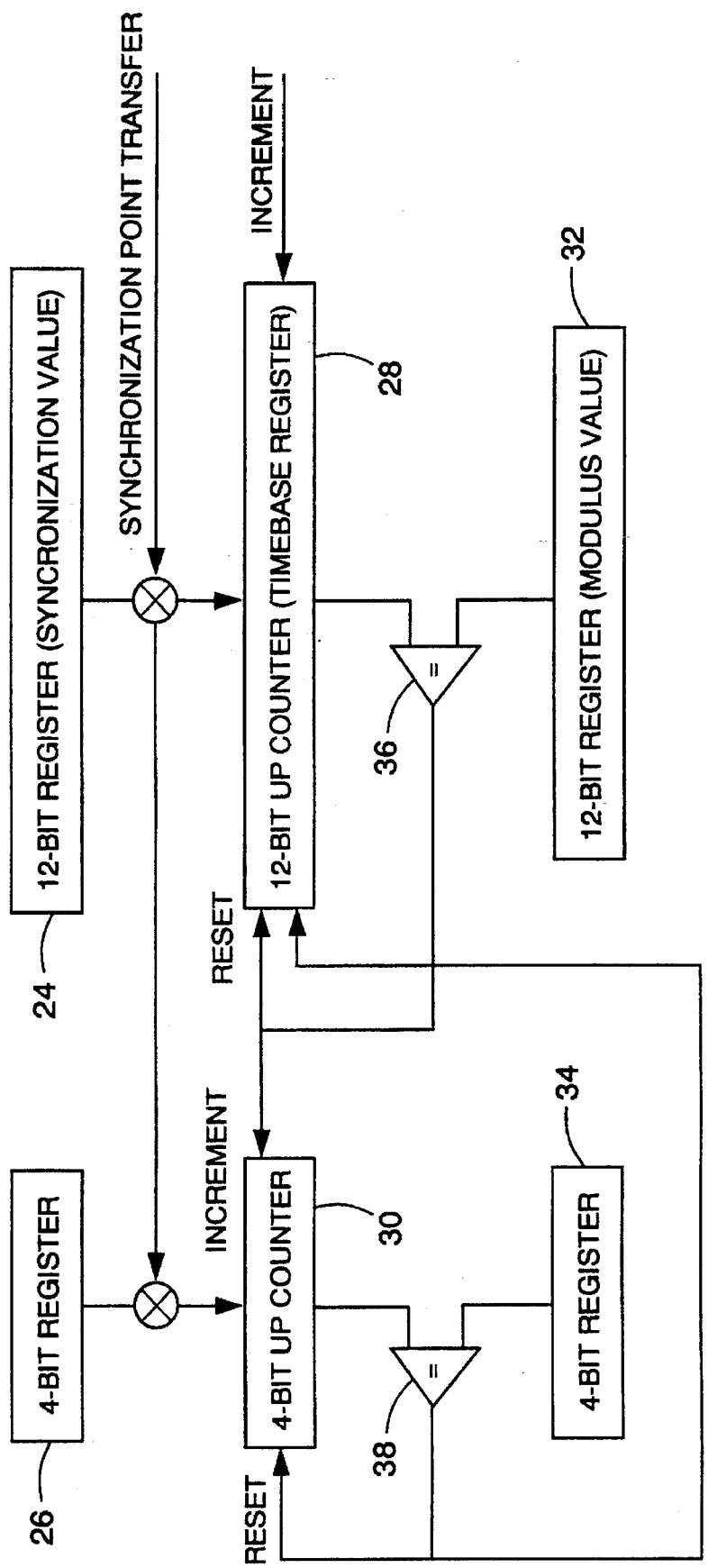
FIG. 2 is a schematic block diagram of the hardware implemented to generate the engine position dependent output control signal of the present invention.

Turning now to FIG. 2, there is shown a schematic block diagram of the hardware implemented to generate the engine position dependent output control signal of the present invention. The hardware includes a twelve-bit synchronization register 24 and a four-bit synchronization register 26 for storing synchronization point values. The synchronization point value is typically the first tooth event after a missing tooth while the CID signal is high. The synchronization point value is programmable so that each timebase may be aligned with the engine separately. The hardware also includes a twelve-bit Timebase Register 28 and a four-bit Timebase Register 30 which are incremented at qualified degree ticks.

The hardware further includes a twelve-bit Modulus Register 32 and a four-bit Modulus Register 34 representing the maximum count value reached by the degree timebase before rolling over to zero. The values of the twelve-bit Timebase Register 28 and the four-bit Timebase Register 30 are compared to the values of the twelve-bit Modulus Register 32 and the four-bit Modulus Register 34 via a first comparator 36 and a second comparator 38, respectively. Once a match occurs between the twelve-bit Timebase Register 28 and the twelve-bit Modulus Register 32, the twelve-bit Timebase Register 28 is reset and the four-bit Timebase Register 30 is incremented. Once a match occurs between the four-bit Timebase Register 30 and the four-bit Modulus Register 34, the four-bit Timebase Register 30 is reset.

Figure 3A:
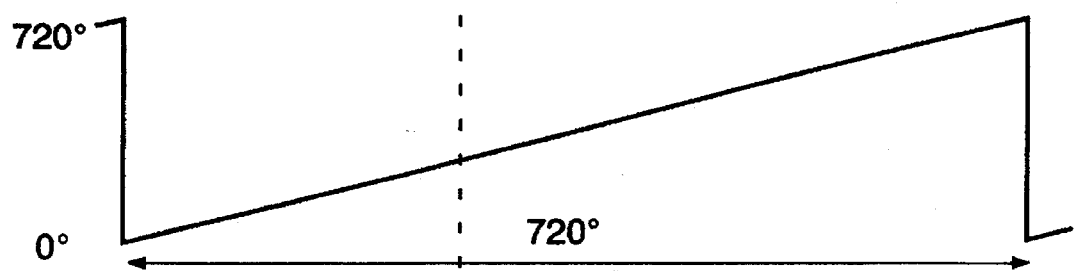
FIGS. 3a–3c are angular waveforms illustrating the method and system of the present invention for an even fire engine; and, FIGS. 4a–4b are angular waveforms illustrating the method and system of the present invention for an odd fire engine.
Figure 3B:
Figure 3B:
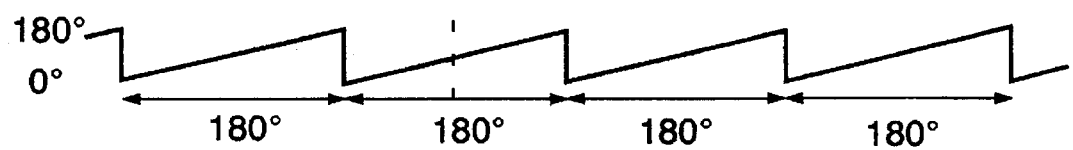
Figure 3C:
Figure 3C:
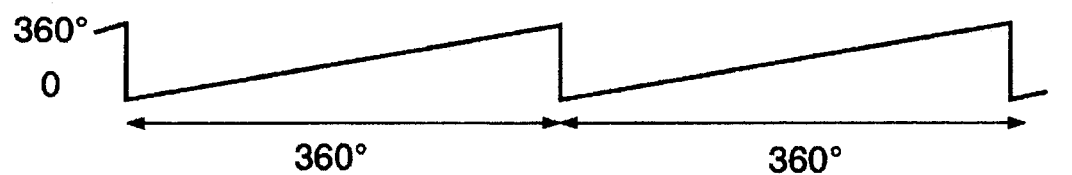

Turning now to FIGS. 3a–3c, there is shown the engine position timebase encoding of the present invention for an even fire engine. FIG. 3a illustrates the 720 degree engine cycle. FIG. 3b illustrates a one cylinder event modulus for the even fire engine. As shown, the angle position/value (lower twelve bits) counts from 0 to 180 degrees and the sector counter (upper four bits) counts each time the lower twelve bits change from 180 to 0 degrees. The two cylinder event modulus, as shown in FIG. 3c, is the same except the lower twelve bits counts from 0 to 360 degrees and the upper four bits count from 0 to 1. By using this method, output events can be scheduled to occur every cylinder event, every two cylinder events or once per engine cycle with no processor overhead. The timebase encoding is similar for 6, 8, 10 and 12 cylinder engines.

An odd fire engine requires a different approach to timebase encoding than an even fire engine. The regularity for odd fire engines is on a two cylinder event basis instead of a one cylinder event basis as is done for even fire engines. A good example of this is an odd fire 6 cylinder engine. One configuration of an odd fire 6 cylinder would be 90–150, or in other words, the engine would fire first at Top Dead Center (TDC) (0 deg), the next cylinder would fire 90 degrees from the first. The third cylinder would fire 150 degrees from the second and the fourth cylinder would fire again at 90 degrees from the third. This alternating pattern is repeated through all the cylinders in the engine. Notice that the pattern repeats every 2 cylinder events instead of every 1 cylinder event as with the even fire engines. However, the sum of the angular rotations over the 2 cylinder events on both even and odd fire engines is the same, i.e. the angular rotation for 2 cylinder events on both an even and odd fire 6 cylinder is 240 degrees. It is for this reason that the timebase encoding is different for the odd fire engine vs. the even fire engine.

Figure 4A:
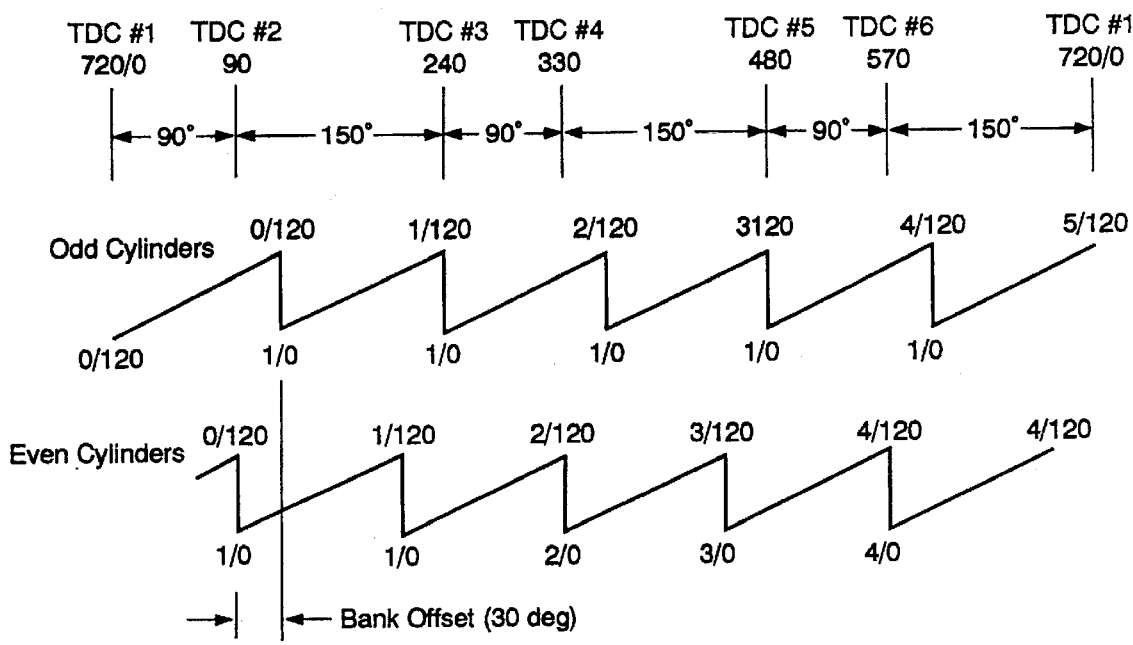
Figure 4B:
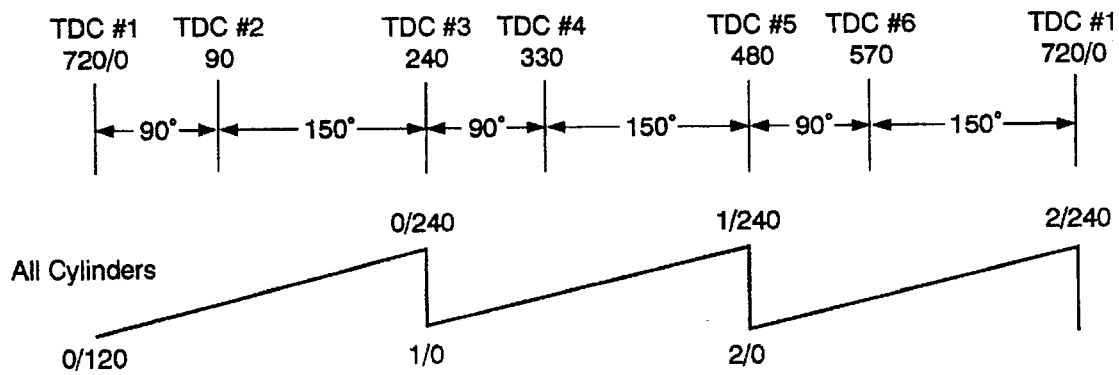

There are two different ways of handling odd fire engines. The first is to use 2 different independent but related 1 cylinder event modulus angle base. The odd cylinders are assigned to one angle base and the even cylinder are assigned to the other angle base. The two angle bases are offset by the difference in the firing angles (bank offset). FIG. 4a illustrates the 2 angle base 1 cylinder event modulus with an offset between them (bank offset). The second method uses 1, 2 cylinder event modulus angle base. This angle base is used for all cylinders and the bank offset is accounted for in software. FIG. 4b illustrates the 1 angle base 2 cylinder event modulus.

The angular engine position dependent output control signal allows referencing to position within the engine only or to a position within a particular sector. The sector count may be used to multiplex the output to different pins for each sector, e.g., a silicon distributor. The angular engine position encoding of the present invention also facilitates the generation of engine periodic events with varying repetition rates during an engine cycle without processor servicing and with minimal event generation hardware. Current systems, on the other hand, must duplicate hardware for events occurring a number of times within an engine cycle, or require processor servicing.

While the best modes for carrying out the invention have been described in detail, those familiar with the art to which this invention relates will recognize various alternative designs and embodiments for practicing the invention as defined by the following claims.

What is claimed is:

1. A method for generating a position dependent output control signal for a rotating machine having a plurality of sectors, comprising:

sensing a position of the rotating machine and generating a corresponding position signal; and processing the position signal to obtain the position dependent output control signal including a first control signal and a second control signal, the first control signal representing a sector of the rotating machine, and the second control signal representing the absolute position within the sector.

2. The method as recited in claim 1 wherein the position dependent output control signal is a sixteen-bit signal and wherein the upper four bits of the sixteen-bit signal correspond to the first control signal and the lower twelve bits correspond to the second control signal.

3. The method as recited in claim 1 wherein the step of sensing the position of the rotating machine includes the step of sensing the angular position of the rotating machine and wherein the second control signal is an angular value.

4. The method as recited in claim 1 wherein the position dependent output control signal is a multiple of the number of sectors.

5. The method as recited in claim 1 wherein the rotating machine is an internal combustion engine and the plurality of sectors correspond to a plurality of cylinders and the position dependent output control signal is an engine position dependent output control signal.

6. The method as recited in claim 5 wherein the engine includes at least one spark plug and the method further comprising the step of controlling the at least one spark plug based on the engine position dependent output control signal.

7. A system for generating a position dependent output control signal for a rotating machine having a plurality of sectors, comprising:

a sensor for sensing a position of the rotating machine and generating a corresponding position signal; and a processor for processing the position signal to obtain the position dependent output control signal including a first control signal and a second control signal, the first control signal representing a sector of the rotating machine, and the second control signal representing the absolute position within the sector.

8. The system as recited in claim 7 wherein the position dependent output control signal is a sixteen-bit signal and wherein the upper four bits of the sixteen-bit signal correspond to the first control signal and the lower twelve bits correspond to the second control signal.

9. The system as recited in claim 7 wherein the sensor senses the angular position of the rotating machine and wherein the second control signal is an angular value.

10. The system as recited in claim 7 wherein the position dependent output control signal is a multiple of the number of sectors.

11. The system as recited in claim 7 wherein the rotating machine is an internal combustion engine and the plurality of sectors correspond to a plurality of cylinders and the position dependent output control signal is an engine position dependent output control signal.

12. The system as recited in claim 11 wherein the sensor includes a variable reluctance sensor.

13. The system as recited in claim 11 wherein the sensor includes a cylinder identification sensor.

14. The system as recited in claim 13 wherein the sensor is a Hall effect cylinder identification sensor.

15. The system as recited in claim 11 wherein the engine further includes at least one spark plug and wherein the processor further controls the at least one spark plug based on the engine position dependent output control signal.

* * * * *